United States Patent Office 3,694,241
Patented Sept. 26, 1972

3,694,241
METHOD FOR CHEMICALLY PRINTING
James L. Guthrie, Ashton, and Francis J. Rendulic, Ellicott City, Md., assignors to W. R. Grace & Co., New York, N.Y.
No Drawing. Filed Apr. 19, 1971, Ser. No. 135,435
Int. Cl. B41c 1/08; B41m 1/24; D06n
U.S. Cl. 117—15                     4 Claims

ABSTRACT OF THE DISCLOSURE

The invention disclosed is directed to a method for printing which includes selectively depositing onto an activator-containing substrate a curable ink composition having as essential ingredients (A) a pigment, (B) a polyene containing at least 2 reactive unsaturated carbon-to-carbon bonds per molecule, and (C) a polythiol containing 2 or more thiol groups per molecule. Optionally, a sensitizer may be included if desired to improve the curing time and efficiency. The activator containing substrate having the ink composition selectively deposited thereon effects cure of the ink composition. The method is particularly useful for high speed printing on absorbent papers such as newsprint. Images thus printed are found to be characterized by high gloss, good color strength, high opacity, and excellent permanence.

---

This invention relates to a method for printing which includes selectively depositing a curable printing ink composition onto an activator-containing substrate. The printing ink composition is cured after being selectively deposited by the activator in the substrate.

Inks typically used in printing may be classified as either drying inks or absorbing inks. Although drying inks are useful for producing quality images characterized by high gloss, they nevertheless require special drying oils, complicated drying equipment and lengthy drying periods. As a practical matter, the drying time required to set typical drying inks limits effective use in high-speed newspaper printing operations.

Quick setting-absorbing inks have been used in printing newspapers and although the fast-setting nature of these inks renders them useful, the images printed therewith are usually characterized by a number of disadvantages, including transparency, low gloss, strike through and lack of permanency. Further, non-black colored absorbing inks are characterized particularly by low gloss and lack of good color strength.

Previous attempts to develop improved inks suitable for printing on newsprint have been generally unsatisfactory for several reasons including premature setting which results in fouling of the presses and image tackifying prior to drying.

It has now been found by the practice of the present method that curable printing ink composition may be used to print and set glossy, permanent images on a substrate such as newsprint in a rapid, simple and efficient manner which overcomes many of the difficulties experienced by those of the prior art. Images using the present method when printed and set on an activator-containing substrate are generally found to be characterized by high resistance to rub-off, improved gloss, and superior color strength than have heretofore been realized using more conventional ink compositions. Printing and setting of images may be thus accomplished by a rapid simple and efficient method, eminently suited especially to the requirements of the newspaper printing art.

Generally stated therefore, the present method provides selectively depositing onto an activator containing substrate, a curable printing ink composition having as essential ingredients (A) a pigment, (B) a polyene containing at least 2 reactive unsaturated carbon-to-carbon bonds per molecule, and (C) a polythiol containing two or more thiol groups per molecule. Optionally, a sensitizer may be included if desired to improve the curing time and efficiency. The activator containing substrate having the ink composition selectively deposited thereon effects cure of the ink composition.

Numerous polyene-polythiol compositions operable herein are disclosed by Kehr and Wszolek in commonly assigned application U.S. Ser. No. 49,207, filed June 23, 1970, and incorporated herein by reference. Broadly stated, these polyene-polythiol compositions include a polyene containing at least 2 reactive unsaturated carbon-to-carbon bonds per molecule and a polythiol containing at least 2 thiol groups per molecule. A specific example of a useful polyene-polythiol composition is one wherein the polyene is the reaction product of poly (tetramethylene ether) diol having a molecular weight in a range from about 2,000 to about 3,000 and allyl isocyanate in a mole ratio of 1:2 respectively, and the polythiol is pentaerythritol tetrakis ($\beta$-mercaptopropionate).

The method of the present invention may be effectively practiced using a curable composition which includes from about 2 to about 98 parts by weight polyene and from about 2 to about 98 parts by weight polythiol. Within these ranges, the relative amounts of polyene and polythiol are selected such that the total combined functionality of (a) the reactive unsaturated carbon-to-carbon bonds per molecule of the polyene and (b) the thiol groups per molecule in the polythiol is greater than 4.

The term "functionality" as used herein refers to the average number of ene or thiol groups per molecule in the polyene or polythiol, respectively. For example, a triene is a polyene with an average of three "reactive" carbon-to-carbon unsaturated groups per molecule and thus has a functionality ($f$) of three. A polymeric dithiol is a polythiol with an average of two thiol groups per molecule and thus has a functionality ($f$) of two.

In general, it is preferred, especially at or near the operable lower limits of functionality in the polyene and polythiol, to use the polythiol and the polyene compounds in such amounts that there is one thiol group present for each double bond, it being understood that the total functionality of the system must be greater than four, and the functionality of the thiol and the diene must each be at least two.

Numerous sensitizers are useful to improve the curing time and efficiency of the present method, and include for example o-anisaldehyde; 2,4,5-trimethoxybenzophenone; 6-methoxy-1-tetralone; 5-methoxy-1-tetralone, 3,3',4,4'-benzophenone tetracarboxylic anhydride; and 2,4,6 - trimethoxybenzophenone and blends thereof. Of these fast curing materials, it is observed that sensitizers such as 2,4,6-trimethoxybenzophenone; 3,3',4,4' - benzophenone tetracarboxylic anhydride and 5-methoxy-1-tetralone; are especially useful with 5-methoxy-1-tetralone being generally preferred. Although almost any concentration of sensitizer may be used, a concentration from about 0.01 to about 10 parts by weight per 100 parts by weight of polyene-polythiol is useful with from about 0.05 to about 5 parts by weight on the same basis being preferred.

The pigment which is added may be a colored organic and inorganic compounds which is normally used to impart color, as well as related organic dyes. No general restriction is known as to useful pigments or dyes except that they be non-reactive with components of the ink composition. Illustrative of inorganic pigments are titanium dioxide and carbon black, metallic flakes, powders and dust such as aluminum powder, bronze powder, and the like. Organic pigments and dyes which may be used include for example Bonadur Red, Ranger Red, Permanent Red 2b, Pthalocyanine Blue, Pthalocyanine Green, Cadmium Lith Primrose Yellow, Benzidine Yellow, Lithol Red, Lithol Rubine, Toluidine Red, Toluidine Yellow, Hansa Yellow, Irgazine Yellow, Irgazine Orange, Irgazine Red, Irgazine Violet, and the like.

Although the concentration of pigment in the present ink composition is not critical, a sufficient amount should be used to provide adequate color strength. While economic factors generally determine the maximum amount of pigment to be used, it should be noted that excessive amounts of pigments may render the ink composition too viscous for convenient handling or may tend to cause the ink to chalk upon curing.

Generally, printing ink compositions useful in the present method include pigments in an amount from about 1 to about 30 parts by weight per 100 parts by weight of polyene-polythiol although pigment loadings as high as 200 parts on the same basis may be used effectively in some of these compositions. The specific amount of pigment to be used is dependent upon the coloring properties of the pigment, properties of the inks and the like.

The present curable printing ink compositions are found to be rapidly curable by contact with an activator thus making them eminently suitable for use such as in newspaper printing and other related high speed printing operations. A one micron thick film of the present ink composition, such as may be used in newspaper printing, may be completely cured well within current printing speeds. Thus, a one-micron thick film of these ink compositions on a newspaper web is capable of being completely cured within web speeds even as high as 2,000 feet per minute. The ink composition may be cured using longer periods of exposure, if desired, such as up to about 15 seconds.

The printing ink compositions useful in the present method may be prepared using any suitable means to effect a uniform dispersion of the essential ingredients thereof. It has been found that a suitable dispersion may be prepared by milling the ingredients in a 3-roll mill. Ink compositions prepared using the aforementioned essential ingredients are generally found to have suitable viscosities and dispersion characteristics for effective use in the present printing method.

Although the curable ink compositions are generally suitable for printing by the present method, it is found that in many instances they may be conveniently prepared for efficient printing if the essential ingredients are combined with water, stabilizer, antioxidant, dispersing agent, thickener, surface active agent, or other similar additive, or blend thereof, as desired. Water may desirably be included in the present ink composition to assist in dispersing the pigment or to adjust the viscosity within a particular range. A stabilizer such as monosodium phosphate may usefully be included in the present inks to prevent skin formation upon storing of the present ink composition. Further, emulsifiers may be added which generally facilitate use of aqueous cleaners for cleaning of printing equipment. The emulsifier may also serve to adequately disperse the various ingredients of the photocurable ink composition.

The preferred composition for use in the present method typically further includes a stabilizing agent to resist skinning, water, and an emulsifier.

The ingredients and approximate operable and preferred amounts of the present curable printing ink composition are tabulated below. Parts are in parts by weight throughout this disclosure unless indicated otherwise.

| Ingredient | Approximate parts per 100 parts polyene-polythiol | |
|---|---|---|
| | Operable range | Preferred range |
| Polyene | 2–98 | 30–90 |
| Pigment | 1–200 | 1–30 |
| Water | 0–500 | 20–100 |
| Polythiol | 2–98 | 30–90 |
| Emulsifier | 0–10 | 0.1–5 |
| Stabilizer | 0–5 | 0.03–3 |

Although almost any stabilizer which resists formation of skin may be used in these compositions, the inorganic phosphates are found to be particularly useful. Examples of useful inorganic phosphates include calcium phosphate, the mono-, di-, and tribasic phosphates of ammonium, sodium, and potassium and blends thereof; with monosodium phosphate being preferred.

Numerous emulsifiers are operable in the compositions useful in the present method. Pluronic F 108 (trade name for a condensate of ethylene oxide with a hydrophobic base formed by condensing propylene oxide with propylene glycol as prepared by Wyandotte Chemicals Corp.) is found particularly useful. Although the presence of an emulsifier is generally optional, it is necessarily included when the pigment is a pthalocyanine. In the absence of an emulsifier, compositions including phthalocyanine pigments are found to undergo separation of water from the dispersion.

The present ink compositions are preferably prepared by first dispersing a polyene and a pigment into water. After the polyene and pigment are adequately dispersed, the polyethiol and the photosensitizer are next incorporated into the polyene-pigment aqueous dispersion in the absence of actinic light. Thereafter, a stabilizer and an emulsifier are incorporated desirably into the aqueous dispersion of polyene, pigment, polythiol, and sensitizer.

In using any of these compositions in the present method for printing, the ink composition is first selectively deposited to a desired thickness onto an activator-containing substrate. A practical method for selectively depositing the ink composition includes coating the ink onto a printing plate and thereafter contacting the ink coated plate with the activator-containing substrate.

Substrates which may be printed using the present method include, for example, newsprint and other types of paper, regenerated cellulose and other cellulosic materials, and the like.

The substrates include an activator such as ferric compounds exemplified by ferric chloride and the like. Ferric compounds are found to be effective in curing the present compositions from a fluid state to a glossy, hard state. The activator may be incorporated in the substrate by using a volatile solvent as a carrier which subsequently vaporizes from the substrate leaving the activator as a precipitate. The activator may be also applied as a spray prior to the printing operation.

The ink composition may be usefully applied to the substrate in a wide range of thicknesses. As a practical matter, however, a thickness ranging from about 0.5 micron to about 10 microns is desirable; with a thickness from about 1 to about 5 microns preferred.

The present method is particularly suitable for high speed printing operations such as are used in the newspaper printing business. Existing newspaper printing methods may easily be modified by using existing printing plates and existing printing presses to selectively deposit the present printing ink composition onto an activator containing newsprint web. The method may be adapted for any practical web speed used in continuous printing. The web-disposed ink composition images thus are effectively cured to hard glossy permanent images.

Practice of the present invention will be further illustrated by the following specific examples.

EXAMPLE 1

A polydiene is prepared by reacting allyl isocyanate with a poly (tetramethylene ether) diol having a molecular weight of about 2,000 using a molar ratio of 2:1 of the isocyanate to the diol. Using the prepared polydiene, a curable printing ink composition having the following ingredients in amounts indicated is formulated.

| Ingredients: | Parts per 100 parts polyene-polythiol combination |
|---|---|
| Polydiene | 83 |
| Bonadur Red | 5.2 |
| Pentaerythritol tetrakis($\beta$ - mercaptopropionate) | 17 |
| 2,4,6-trimethoxybenzophenone | 0.52 |

The Bonadur Red pigment is first dispersed into the polydiene on a 3-roll mill. The pentaerythritol tetrakis($\beta$-mercaptopropionate) polythiol and the 2,4,6-trimethoxybenzophenone are next to codispersed into the initial polydiene-pigment dispersion by blending for two hours in a blender maintained at about 80° C.

A newsprint quality printing paper substrate is dipped into a 0.01% to 0.1% by weight aqueous ferric chloride solution, blotted, and permitted to dry. The ferric chloride activator containing paper is ready to receive the curable printing ink.

The prepared curable printing ink composition is coated onto the image portions of a relief printing plate, and the plate is pressed against the ferric chloride containing sheet of newsprint to selectivity deposit the ink composition. Sufficient ink is used to deposit images about 2 microns in thickness onto the paper.

The selectively deposited ink composition now appears as a network of glossy opaque images having a bright red tone and a strong color intensity. The paper is notably absent of strike-through. Upon attempting to remove or smear these printed images by rubbing, the cured composition is found to have good hardness and excellent permanence properties.

EXAMPLE 2

An aqueous dispersion is prepared using ingredients of Example 1. Pluronic F 108 (tradename for a condensate of ethylene oxide with a hydrophobic base formed by condensing propylene oxide with propylene glycol as prepared by Wyandotte Chemicals Corp.) is included as an emulsifier. Trisodium phosphate is also included as a stabilizer. This curable printing ink composition has the following formulation.

| Ingredients: | Parts per 100 parts polyene-polythiol combination |
|---|---|
| Polydiene | 83 |
| Phthalocyanine Blue | 5.2 |
| Water | 41.5 |
| Pentaerythritol tetrakis($\beta$ - mercaptopropionate) | 17.0 |
| 2,4,6-trimethoxybenzophenone | 0.52 |
| Pluronic F 180 | 0.65 |
| Trisodium phosphate | 0.26 |

In the amounts indicated, polydiene prepared as in Example 1 and Phthalocyanine Blue are codispersed in water using a 3-roll mill.

The polythiol, sensitizer, emulsifier and stabilizer are codispersed into the aqueous polyene-pigment dispersion by blending for one hour in a blender maintained at 80° C.

The prepared printing ink is printed on ferric chloride activator newsprint following the procedure of Example 1. This ink composition is found to be more easily applied to the printing plate. After curing by the activator in the newsprint, the formed images are found to be hard, and glossy while having good color strength.

EXAMPLE 3

A polytetraene is prepared by reacting trimethylolpropane diallyl ether, phthalic anhydride, and diethylene glycol, using molar ratios of 2:8:7 of the three reactants, respectively. The prepared polytetraene is formulated as a curable printing ink composition having the following ingredients in amounts indicated:

| Ingredients: | Parts by weight |
|---|---|
| Polytetraene | 83.0 |
| Titanium dioxide | 100.0 |
| Pentaerythritol tetrakis($\beta$ - mercaptopropionate, hereafter thiol) | 18.0 |
| Benzophenone | 4.0 |
| Ionol (a phenolic antioxidant by Shell Chemical) | 0.4 |
| Irganox 1076 (a phenolic based antioxidant by Geigy Co.) | 0.4 |

The polytetraene, benzophenone, and antioxidants are mixed and heated at 50–60° C. until the mixture is homogeneous. Next, the titanium dioxide pigment and the thiol are added and the mixture passed over a 3-roll mill. The prepared ink is printed using the procedure of Example 2. Corresponding results to Example 2 are experienced.

EXAMPLE 4

The procedure of Example 3 is repeated using a polytetraene prepared from allyl alcohol, phthalic anhydride, trimellitic anhydride, propylene glycol, and diethylene glycol in the ratios 4:7:2:4:4, respectively. The prepared polytetraene is formulated as a curable printing ink composition having the following ingredients in amounts indicated:

| Ingredients: | Parts |
|---|---|
| Polytetraene | 82.0 |
| Thiol of Example 3 | 18.0 |
| Benzidine Yellow | 25.0 |

Printing using the composition of this example is effected by the procedure of Example 2. Corresponding results to that of Example 2 are experienced.

EXAMPLE 5

The procedure of Example 3 is repeated using a polyhexaene prepared from trimethylolpropane diallyl ether, phthalic anhydride, trimellitic anhydride adipic acid, diethylene glycol in the molar ratio 3:28:1:12:40, respectively. The prepared polyhexaene is formulated as a curable printing ink composition having the following ingredients in amounts indicated:

| Ingredients: | Parts by weight |
|---|---|
| Polyhexaene | 92 |
| Thiol of Example 3 | 8 |
| Titanium dioxide | 100 |

Printing using the composition of this example is effected by the procedure of Example 2. Corresponding results to that of Example 2 are experienced.

EXAMPLE 6

The procedure of Example 3 is repeated using a polytetraene prepared from trimethylolpropane diallyl ether, phthalic anhydride, adipic acid, and diethylene glycol in the molar ratio of 2:12:4:15, respectively. The prepared polytetraene is formulated as a curable printing ink composition having the following ingredients in amounts indicated:

| Ingredients: | Parts by weight |
|---|---|
| Polytetraene | 89.0 |
| Thiol of Example 3 | 11.0 |
| Channel Black (carbon black, Regal 330R by Cabot Corp.) | 16.0 |

Printing using the composition of this example is effected by the procedure of Example 2. Corresponding results to that of Example 2 are experienced.

What is claimed is:

1. A method for printing chemically curable printing ink compositions which comprises selectively depositing onto an activator-container substrate, a curable printing ink composition having as essential ingredients (A) from about 1 to about 30 parts by weight of a pigment per 100 parts by weight polyene-polythio components, said pigment selected from the group consisting of titanium dioxide, carbon black, aluminum powder, bronze powder, Bonadur Red, Ranger Red, Permanent Red 2b, Phthalocyanine Blue, Phthalocyanine Green, Cadmium Lith Primrose Yellow, Benzidine Yellow, Lithol Red, Lithol Rubine, Toluidine Red, Toluidine Yellow, Hansa Yellow, Irgazine Yellow, Irgazine Orange, Iragazine Red, and Irgazine Violet; (B) from about 30 to about 90 parts by weight of a polyene containing at least 2 reactive unsaturated carbon-to-carbon bonds per molecule per 100 parts by weight polyene-polythiol components, (C) from about 30 to about 90 parts by weight of a polythio containing two or more thiol groups per molecule per 100 parts by weight polyene-polythiol components; said polyene selected from the group consisting of polydiene prepared by reacting allyl isocyanate with poly (tetramethylene ether) diol having a molecular weight of about 2,000 to about 3,000 using a molar ratio of 2:1 of isocyanate to diol, polytetraene prepared by reacting propane diallyl ether, phthalic anhydride, and diethylene glycol using a molar ratio of 2:8:7 respectively, polytetraene prepared by reacting allyl alcohol, phthalic anhydride, trimellitic anhydride, propylene glycol, and diethylene glycol using a molar ratio of 4:7:2:4:4 respectively, polyhexaene prepared by reacting trimethylolpropane diallyl ether, phthalic anhydride, trimellitic anhydride adipic acid, and diethylene glycol in a molar ratio of 3:28:1:12:40 respectively, and polytetraene prepared by reacting trimethylolpropane diallyl ether, phthalic anhydride, adipic acid, and diethylene glycol in a molar ratio of 2:12:4:15 respectively; said polythiol being pentaerythritol tetrakis-$\beta$-mercaptopropionate); and (D) from about 0.05 to about 5 parts by weight per 100 parts by weight of polyene-polythiol of a sensitizer selected from the group consisting of o-anisaldehyde, 2,4,5-trimethoxybenzophenone, 6-methoxy-1-tetralone, 5-methoxy-1-tetralone, 3,3',4,4'-benzophenone tetracarboxylic anhydride, and 2,4,6-trimethoxybenzophenone; and wherein the activator is a ferric compound, said ink composition being selectively deposited in a thickness from about 0.5 micron to about 10 microns.

2. The method of claim 1 wherein the ferric compound is ferric chloride.

3. The method of claim 1 wherein the ink composition is selectively deposited in a thickness from about 1 to 5 micron.

4. The method of claim 1 wherein the composition includes from about 20 to about 100 parts by weight water, from about 0.1 to about 5 parts by weight emulsifier, and from about 0.03 to about 3 parts by weight stabilizer, all parts being per 100 parts of polyene-polythiol components, said emulsifier being a condensate of ethylene oxide with a hydrophobic base formed by condensing propylene oxide with propylene glycol, and said stabilizer being selected from the group consisting of calcium phosphate, the mono-, di-, and tribasic phosphates of ammonium, sodium and potassium, and monosodium phosphate.

References Cited
UNITED STATES PATENTS 3,055,758  9/1962  McDonald _____ 96—48
3,537,853  11/1970  Wessells et al. _____ 96—35.1

JOAN B. EVANS, Primary Examiner

U.S. Cl. X.R.

8—62; 106—20; 117—38, 60; 260—29.7 R, 29.7 M, 29.7 E, 29.7 EM, 37 R, 41 C